Aug. 21, 1923.
E. E. BITTNER
1,465,622
APPARATUS FOR CUTTING TRENCHES
Original Filed July 19, 1920
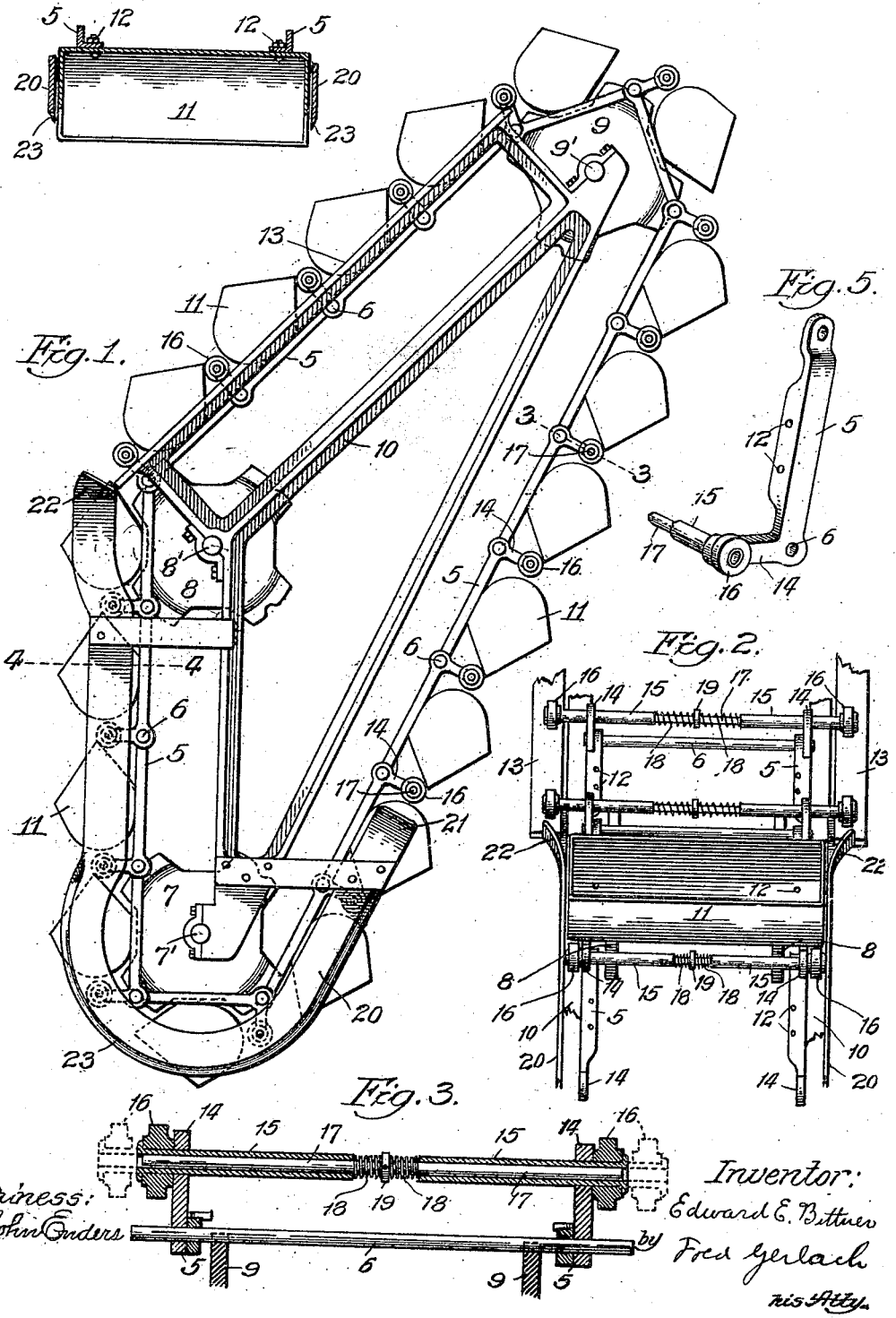
Inventor:
Edward E. Bittner
by Fred Gerlach
his Atty.
Witness:
John Enders Patented Aug. 21, 1923.

1,465,622

UNITED STATES PATENT OFFICE.

EDWARD E. BITTNER, OF CHICAGO, ILLINOIS.

APPARATUS FOR CUTTING TRENCHES.

Application filed July 19, 1920, Serial No. 397,300. Renewed June 6, 1923.

*To all whom it may concern:*

Be it known that I, EDWARD E. BITTNER, a citizen of the United States, and a resident of Chicago, in the county of Cook and State of Illinois, have invented certain new and useful Improvements in Apparatus for Cutting Trenches, of which the following is a full, clear, and exact description.

The invention relates to conveying apparatus more particularly adapted for cutting trenches and its object is to provide improved means for supporting and guiding the links of an endless conveyor provided with buckets for separating material from a mass and elevating it to the desired point of delivery.

The invention consists in the several novel features hereinafter set forth and more particularly defined by claims at the conclusion hereof.

In the drawings: Fig. 1 is a side elevation of an apparatus embodying the invention. Fig. 2 is an end elevation of a portion of the apparatus. Fig. 3 is a cross section through a pair of the supporting rollers. Fig. 4 is a cross section through one of the lowermost buckets and its guides. Fig. 5 is a perspective of one of the links on the endless conveyor.

The apparatus comprises a conveyor consisting of an endless series of links 5 which are pivotally connected to one another by rods 6. The conveyor is supported by wheels 7, 8 and 9 which are provided with notches to receive the rods 6 of the conveyor. Said wheels are in pairs and are respectively mounted on shafts 7', 8' and 9', which are carried by bearings in a suitable framework 10 which may be supported in any suitable manner, as well understood in the art. Buckets 11 are rigidly secured to the links 5 by bolts 12. The wheels 7, 8 and 9 are relatively disposed so that the buckets 11 will be forced into the ground to make a cut or to pass through a mass of material as they are passing around the wheels 7 and will discharge their contents as they are passing around the wheels 9, the wheels 8 serving as intermediate supports for the links.

To support the loaded buckets and prevent them from spilling their contents in transit between the wheels 8 and 9, rails 13 are provided. Each link is provided with a rigid arm 14. A sleeve 15 is slidably held in a hole in the outer end of each link and is provided at its outer end with a roller 16 which is adapted to run on one of the rails 13 to support the links and buckets between the wheels 8 and 9. Sleeves 15 are transversely slidable in the arms 14 and cross rods 17 are extended into the aligned sleeves 15. Springs 18 are interposed between a shoulder 19 on the cross-rod 17 and the inner ends of the sleeves 15 to press the sleeves and rollers 16 outwardly into position to run on the track 13 while the links are passing between the wheels 8 and 9 at which time the buckets are loaded. While the buckets are penetrating the material being dug or removed, it is desirable that the rollers should be disposed within the cut, so they will not interfere with the penetration and cutting of the conveyor and for this purpose the rollers 16 are mounted on the slidable sleeves 15 and can be shifted inwardly so they will lie within the cut. Flat bars 20 are provided at the sides of the conveyor adjacent the wheels 7 and are extended to a point adjacent the commencement of the track 13. These bars 20 are flared, as at 21, so that as the rollers reach the bars, they will be forced inwardly against the force of springs 18 and held between said bars and the buckets. These bars will hold the rollers inwardly of the sides of the bucket while they are passing through the cut and until they pass off the bars 20 which are also flared, as at 22, to release the rollers and permit them to be spread before reaching the rails 13. Bars 20 have bevelled edges 23 so that they will interfere very little with their passage through the cut or material.

In operation, the conveyor will be driven by power applied through one of the shafts 8' and 9'. The buckets, on encountering the soil or material to be conveyed, will be loaded as they are passing around the wheels 7. While the buckets are in the soil or material to be conveyed, the roller 16 will be held within the planes of the bucket-sides by the bars 20. As the rollers leave the flared end 22 of the bars 20, they will be spread by the springs 18 so that the rollers will engage and ride on the rails 13 and support the loaded buckets. While thus supported, the links 5 and loaded buckets 11 will be controlled and held so the material will not be discharged therefrom. As the buckets pass around the wheels 9, the material will be discharged. On reaching the flared end 21 of the bars 20, the rollers will be moved inwardly before they pass into the material being excavated or to be conveyed.

The invention exemplifies an excavating or conveying apparatus in which provision is made for supporting the links and buckets by tracks disposed outside of the bucket sides after they have been loaded and in which the supporting rollers on the links are pushed inwardly while the buckets are being loaded.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In apparatus of the character described, the combination of an endless conveyor comprising links and buckets secured to the links, a supporting track, transversely movable devices on the links cooperating with the track to support the conveyor, and means for controlling said devices to bring them together when they are off the track, the track being disposed outside of the sides of the buckets.

2. In apparatus of the character described, the combination of an endless conveyor comprising links having rigid arms and buckets secured to the links, a supporting track, transversely movable devices at the outer ends of the arms cooperating with the track to support the conveyor, and means for controlling said devices to bring them together, the track being disposed outside of the sides of the buckets.

3. In apparatus of the character described, the combination of an endless conveyor comprising links and buckets secured to the links, a supporting track, transversely movable devices on the links and between the buckets cooperating with the track to support the conveyor, and means for controlling said devices to bring them together, the track being disposed outside of the sides of the buckets.

4. In apparatus of the character described, the combination of an endless conveyor comprising links and buckets secured to the links, a supporting track, transversely movable devices on the links, cooperating with the track to support the conveyor, and means for controlling said devices comprising springs to spread them and stationary bars to force them together, the track being disposed outside of the sides of the buckets.

5. In apparatus of the character described, the combination of an endless conveyor comprising links and buckets secured to the links, a supporting track disposed outside of the sides of the buckets, rollers adapted to ride on said tracks and mounted to slide transversely in the links, springs for spreading the rollers, and means for shifting the rollers inwardly while the buckets are in the cut.

6. In apparatus of the character described, the combination of an endless conveyor comprising links and buckets secured to the links, a supporting track disposed outside of the sides of the buckets, rigid arms on the links, rollers adapted to ride on said tracks mounted to slide transversely in the outer ends of the arms, springs for spreading the rollers, and means for shifting the rollers inwardly while the buckets are in the cut.

7. In apparatus of the character described, the combination of an endless conveyor comprising links and buckets secured to the links, a supporting track disposed outside of the sides of the buckets, rigid arms on the links, cross-shafts carried by the arms between the buckets, rollers mounted on the shafts and adapted to ride on said tracks, and to slide transversely, springs for spreading the rollers, and means for shifting the rollers inwardly while the buckets are in the cut.

EDWARD E. BITTNER.